(12) United States Patent
Oshima

(10) Patent No.: US 7,807,747 B2
(45) Date of Patent: Oct. 5, 2010

(54) CONJUGATED DIENE POLYMER, METHOD FOR PRODUCING CONJUGATED DIENE POLYMER, AND CONJUGATED DIENE POLYMER COMPOSITION

(75) Inventor: Mayumi Oshima, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 297 days.

(21) Appl. No.: 12/139,547

(22) Filed: Jun. 16, 2008

(65) Prior Publication Data

US 2008/0319151 A1   Dec. 25, 2008

(30) Foreign Application Priority Data

Jun. 22, 2007   (JP) .............................. 2007-164927

(51) Int. Cl.
 *C08L 9/00* (2006.01)
(52) U.S. Cl. ...................... 524/588; 524/571; 524/575; 525/100; 525/105; 525/106
(58) Field of Classification Search ........................ None
 See application file for complete search history.

(56) References Cited

U.S. PATENT DOCUMENTS

| | | | | | |
|---|---|---|---|---|---|
| 3,244,664 | A | * | 4/1966 | Zelinski et al. ............. | 524/525 |
| 5,066,721 | A | * | 11/1991 | Hamada et al. ............. | 525/102 |
| 5,508,333 | A | * | 4/1996 | Shimizu ...................... | 524/424 |
| 7,288,594 | B2 | * | 10/2007 | Ozawa et al. ................ | 525/105 |

FOREIGN PATENT DOCUMENTS

| JP | 63-186748 A | 8/1988 |
|---|---|---|
| JP | 1-217047 A | 8/1989 |
| JP | 2005-290355 A | 10/2005 |

\* cited by examiner

*Primary Examiner*—Marc S Zimmer
(74) *Attorney, Agent, or Firm*—Sughrue Mion, PLLC

(57) ABSTRACT

A conjugated diene polymer is provided that contains a conjugated diene-based monomer unit and a group represented by Formula (I) below, at least peaks H, M, and L below being present in a molecular weight distribution curve obtained by gel permeation chromatography measurement, and when the total area of the molecular weight distribution curve is 100%, the total peak area of peak H is 3% to 30%, the total peak area of peak M is 5% to 45%, and the total peak area of peak L is 40% to 80%

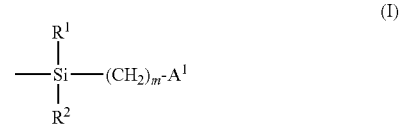

(in Formula (I), $R^1$ and $R^2$ independently denote a hydrocarbon group having 1 to 4 carbon atoms, a hydrocarbonoxy group having 1 to 4 carbon atoms, a hydroxy group, or a polymer chain containing a conjugated diene-based monomer unit, m denotes an integer of 0 to 10, and $A^1$ denotes a polar functional group that does not have an active hydrogen)

Peak H: a peak for which the molecular weight at the peak top is higher than the molecular weight at the peak top of peak M Peak M: a peak for which, when the molecular weight at the peak top of peak H is MH, the molecular weight at the peak top is 0.6×MH to 0.8×MH Peak L: a peak for which, when the molecular weight at the peak top of peak H is MH, the molecular weight at the peak top is 0.2×MH to 0.4×MH.

16 Claims, 3 Drawing Sheets

CONJUGATED DIENE POLYMER, METHOD FOR PRODUCING CONJUGATED DIENE POLYMER, AND CONJUGATED DIENE POLYMER COMPOSITION

BACKGROUND OF THE INVENTION

1. Field of the Invention

The present invention relates to a conjugated diene polymer, a method for producing a conjugated diene polymer, and a conjugated diene polymer composition.

2. Description of the Related Art

As a material for automobile tires, a polymer composition comprising a conjugated diene polymer such as polybutadiene or a butadiene-styrene copolymer as a rubber component and carbon black, silica, etc. as a reinforcing agent is used. In recent years, the demand for good fuel economy of automobiles has been increasing; with regard to the material for automobile tires there is a desire for a material having low rolling resistance, and as such a rubber component a conjugated diene polymer into which a functional group has been introduced has been proposed. For example, as a conjugated diene polymer used in the rubber component, JP-A-1-217047 (JP-A denotes a Japanese unexamined patent application publication) proposes a butadiene-styrene copolymer modified with a dialkylamino group-containing acrylamide compound. Furthermore, JP-A-63-186748 and JP-A-2005-290355 describe a butadiene-styrene copolymer modified with a dialkylamino group-containing alkoxysilane compound.

BRIEF SUMMARY OF THE INVENTION

However, polymer compositions comprising the conventional conjugated diene polymers above as a rubber component are not fully satisfactory in terms of processability.

In the light of such circumstances, it is an object of the present invention to provide a conjugated diene polymer that can give a polymer composition having excellent processability and good fuel economy, a method for producing the conjugated diene polymer, and a polymer composition comprising the conjugated diene polymer combined with silica.

The object of the present invention has been accomplished by means of (1), (9) and (15) below, which are described below together with (2) to (8), (10) to (14), and (16) which are preferred embodiments.

(1) A conjugated diene polymer comprising a conjugated diene-based monomer unit and a group represented by Formula (I) below, wherein at least peaks H, M, and L below are present in a molecular weight distribution curve obtained by gel permeation chromatography measurement, and when the total area of the molecular weight distribution curve is 100%, the total peak area of peak H is 3% to 30%, the total peak area of peak M is 5% to 45%, and the total peak area of peak L is 40% to 80%

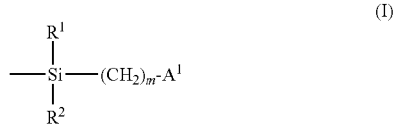

(I)

(in Formula (I), $R^1$ and $R^2$ independently denote a hydrocarbon group having 1 to 4 carbon atoms, a hydrocarbonoxy group having 1 to 4 carbon atoms, a hydroxy group, or a polymer chain comprising a conjugated diene-based monomer unit, m denotes an integer of 0 to 10, and $A^1$ denotes a polar functional group that does not have an active hydrogen)

Peak H: a peak for which the molecular weight at the peak top is higher than the molecular weight at the peak top of peak M Peak M: a peak for which, when the molecular weight at the peak top of peak H is MH, the molecular weight at the peak top is 0.6×MH to 0.8×MH Peak L: a peak for which, when the molecular weight at the peak top of peak H is MH, the molecular weight at the peak top is 0.2×MH to 0.4×MH, (2) the conjugated diene polymer according to (1), wherein $A^1$ in Formula (I) is a group represented by Formula (II) or (III) below

(II)

(in Formula (II), $R^3$ and $R^4$ independently denote a hydrocarbon group having 1 to 8 carbon atoms and optionally having a nitrogen atom, an oxygen atom, or a silicon atom, or $R^3$ and $R^4$ are bonded and represent a divalent hydrocarbon group having 2 to 20 carbon atoms and optionally having a nitrogen atom, an oxygen atom, or a silicon atom)

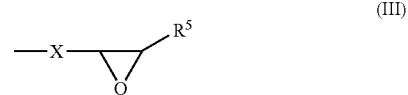

(III)

(in Formula (III), X denotes a divalent hydrocarbon group having 1 to 6 carbon atoms and optionally having an oxygen atom, and $R^5$ denotes hydrogen or a hydrocarbon group having 1 to 6 carbon atoms), (3) the conjugated diene polymer according to (1) or (2), wherein it further comprises an aromatic vinyl-based monomer unit, (4) the conjugated diene polymer according to (3), wherein, when the total amount of the conjugated diene-based monomer unit and the aromatic vinyl-based monomer unit is 100 wt %, the aromatic vinyl-based monomer unit is at least 10 wt % but no greater than 50 wt %, (5) the conjugated diene polymer according to any one of (1) to (4), wherein, when the total area of the molecular weight distribution curve is 100%, the total peak area of the peak H is at least 5% but no greater than 25%, the total peak area of the peak M is at least 10% but no greater than 40%, and the total peak area of the peak L is at least 50% but no greater than 70%, (6) the conjugated diene polymer according to any one of (1) to (5), wherein it has a Mooney viscosity measured at 100° C. in accordance with JIS K6300 of at least 10 but no greater than 200, (7) the conjugated diene polymer according to any one of (1) to (6), wherein, when the content of the conjugated diene-based monomer unit is 100 mole %, the amount of vinyl bonds of the conjugated diene polymer is at least 10 mole % but no greater than 70 mole %, (8) the conjugated diene polymer according to any one of (1) to (7), wherein the conjugated diene polymer is a modified conjugated diene polymer obtained by reacting, with a silicon compound represented by Formula (IV), a conjugated diene polymer obtained by polymerization in a hydrocarbon solvent using an alkali metal catalyst

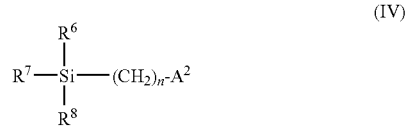

(in Formula (IV), $R^6$, $R^7$, and $R^8$ independently denote a hydrocarbon group having 1 to 4 carbon atoms or a hydrocarbonoxy group having 1 to 4 carbon atoms, at least one of $R^6$, $R^7$, and $R^8$ is a hydrocarbonoxy group having 1 to 4 carbon atoms, n denotes an integer of 0 to 10, and $A^2$ denotes a polar functional group that does not have an active hydrogen), (9) a method for producing a conjugated diene polymer, comprising steps 1, 2, and 3 below:

(step 1): a step of polymerizing a conjugated diene-containing monomer in a hydrocarbon solvent in the presence of an alkali metal catalyst, thus giving a conjugated diene polymer having a terminal catalyst-derived alkali metal;

(step 2): a step of adding a silicon compound represented by Formula (IV) below in an amount of 0.05 to 0.35 moles per mole of alkali metal of the alkali metal catalyst used in step 1 to the hydrocarbon solution of the conjugated diene polymer of step 1 and mixing; and (step 3): a step of adding to the hydrocarbon solution of the conjugated diene polymer of step 2 the silicon compound represented by Formula (IV) below in an amount that together with the amount added in step 2 makes the total amount at least 0.5 moles per mole of alkali metal of the alkali metal catalyst used in step 1 and mixing

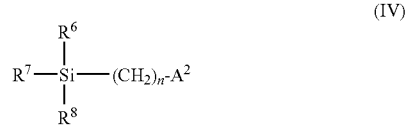

(in Formula (IV), $R^6$, $R^7$, and $R^8$ independently denote a hydrocarbon group having 1 to 4 carbon atoms or a hydrocarbonoxy group having 1 to 4 carbon atoms, at least one of $R^6$, $R^7$, and $R^8$ is a hydrocarbonoxy group having 1 to 4 carbon atoms, n denotes an integer of 0 to 10, and $A^2$ denotes a polar functional group that does not have an active hydrogen),

(10) the method for producing a conjugated diene polymer according to (9), wherein $A^2$ in Formula (IV) is a group represented by Formula (II) or (III) below

(in Formula (II), $R^3$ and $R^4$ independently denote a hydrocarbon group having 1 to 8 carbon atoms and optionally having a nitrogen atom, an oxygen atom, or a silicon atom, or $R^3$ and $R^4$ are bonded and represent a divalent hydrocarbon group having 2 to 20 carbon atoms and optionally having a nitrogen atom, an oxygen atom, or a silicon atom)

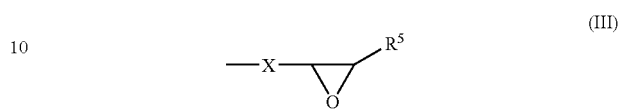

(in Formula (III), X denotes a divalent hydrocarbon group having 1 to 6 carbon atoms and optionally having an oxygen atom, and $R^5$ denotes hydrogen or a hydrocarbon group having 1 to 6 carbon atoms),

(11) the method for producing a conjugated diene polymer according to (9) or (10), wherein all of $R^6$, $R^7$, and $R^8$ in Formula (IV) are hydrocarbonoxy groups having 1 to 4 carbon atoms,

(12) the method for producing a conjugated diene polymer according to any one of (9) to (11), wherein the alkali metal catalyst is an organolithium compound or organosodium compound having 2 to 20 carbon atoms,

(13) the method for producing a conjugated diene polymer according to any one of (9) to (12), wherein the amount of silicon compound represented by Formula (IV) added in step 2 is 0.1 to 0.3 moles per mole of alkali metal of the alkali metal catalyst, and the amount of silicon compound represented by Formula (IV) added in step 3 is, per mole of alkali metal of the alkali metal catalyst used in step 1, at least 1 mole but no greater than 5 moles as a total amount with the amount added in step 2.

(14) the method for producing a conjugated diene polymer according to any one of (9) to (13), wherein the polymerization temperature in step 1 is 0° to 100° C., and the polymerization time is 10 minutes to 5 hours,

(15) a conjugated diene polymer composition comprising the conjugated diene polymer according to any one of (1) to (8) combined with silica, and

(16) the polymer composition according to (15), wherein the amount of silica combined is 10 to 150 parts by weight relative to 100 parts by weight of rubber components including the conjugated diene polymer.

DETAILED DESCRIPTION OF THE INVENTION

Figure 1:
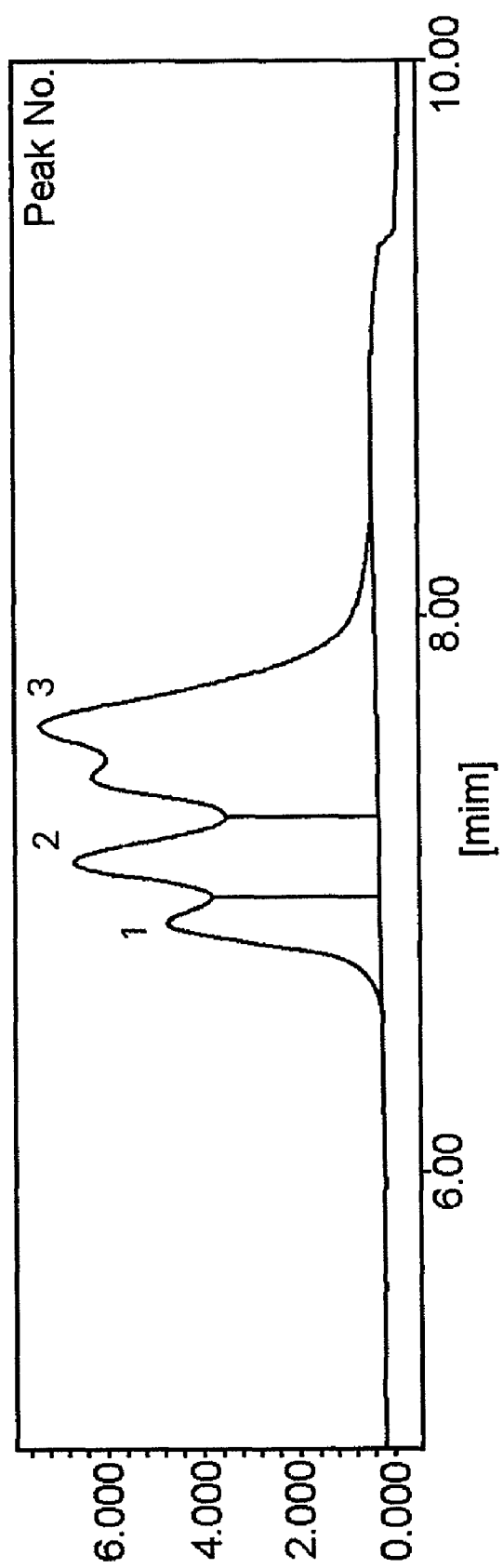
FIG. 1 shows the result of measurement by gel permeation chromatography of the polymer obtained in Example 1.

The conjugated diene polymer of the present invention is a conjugated diene polymer having a conjugated diene-based monomer unit and a group represented by Formula (I) below. The conjugated diene-based monomer unit referred to here means a monomer unit derived from a conjugated diene.

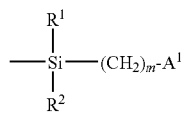
(I)

(In Formula (I), $R^1$ and $R^2$ independently denote a hydrocarbon group having 1 to 4 carbon atoms, a hydrocarbonoxy group having 1 to 4 carbon atoms, a hydroxy group, or a polymer chain comprising a conjugated diene-based monomer unit, m denotes an integer of 0 to 10, and $A^1$ denotes a polar functional group that does not have an active hydrogen).

Examples of the conjugated diene include 1,3-butadiene, isoprene, 1,3-pentadiene, 2,3-dimethyl-1,3-butadiene, and 1,3-hexadiene, and one type thereof may be used on its own or two or more types may be used in combination. From the viewpoint of ready availability by production, 1,3-butadiene and isoprene are preferable.

$R^1$ and $R^2$ independently denote a hydrocarbon group having 1 to 4 carbon atoms, a hydrocarbonoxy group having 1 to 4 carbon atoms, a hydroxy group, or a polymer chain comprising a conjugated diene-based monomer unit. The hydrocarbon group is preferably an alkyl group having 1 to 4 carbon atoms, and examples thereof include a methyl group, an ethyl group, an n-propyl group, an isopropyl group, an n-butyl group, a sec-butyl group, and a tert-butyl group. The hydrocarbonoxy group is preferably an alkoxy group having 1 to 4 carbon atoms, and examples thereof include a methoxy group, an ethoxy group, an n-propoxy group, an isopropoxy group, an n-butoxy group, a sec-butoxy group, and a t-butoxy group. As the hydrocarbonoxy group, a methoxy group and an ethoxy group are preferable. Examples of the polymer chain comprising a conjugated diene-based monomer unit include a polymer chain obtained by homopolymerization or copolymerization of a conjugated diene and another monomer as necessary using an alkali metal catalyst as a polymerization catalyst. With regard to the conjugated diene, two or more types thereof may be used, and with regard to said other monomer, an aromatic vinyl, a vinylnitrile, an unsaturated carboxylic acid ester, etc. can be cited.

From the viewpoint of good fuel economy, $R^1$ and $R^2$ are preferably a hydrocarbonoxy group, and more preferably a methoxy group or an ethoxy group.

m denotes an integer of 0 to 10. From the viewpoint of good fuel economy, it is preferably at least 3, and from the viewpoint of economy during production, it is preferably no greater than 4.

$A^1$ denotes a polar functional group that does not have an active hydrogen, and examples thereof include a group represented by Formula (II) below and a group represented by Formula (III) below.

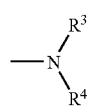
(II)

(In Formula (II), $R^3$ and $R^4$ independently denote a hydrocarbon group having 1 to 8 carbon atoms and optionally having a nitrogen atom, an oxygen atom, or a silicon atom, or $R^3$ and $R^4$ are bonded and represent a divalent hydrocarbon group having 2 to 20 carbon atoms and optionally having a nitrogen atom, an oxygen atom, or a silicon atom).

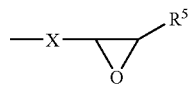
(III)

(In Formula (III), X denotes a divalent hydrocarbon group having 1 to 6 carbon atoms and optionally having an oxygen atom, and $R^5$ denotes hydrogen or a hydrocarbon group having 1 to 6 carbon atoms).

In Formula (II), $R^3$ and $R^4$ independently denote a hydrocarbon group having 1 to 8 carbon atoms and optionally having a nitrogen atom, an oxygen atom, or a silicon atom, or $R^3$ and $R^4$ are bonded and represent a divalent hydrocarbon group having 2 to 20 carbon atoms and optionally having a nitrogen atom, an oxygen atom, or a silicon atom. Examples of the hydrocarbon group having 1 to 8 carbon atoms include an alkyl group, an aryl group, an alkoxyalkyl group, and a trialkylsilyl group. In the present invention, unless otherwise specified, the alkyl group may be any of straight chain, branched, or cyclic. Specific examples of the hydrocarbon group include a methyl group, an ethyl group, an n-propyl group, an isopropyl group, an n-butyl group, a sec-butyl group, a t-butyl group, an n-pentyl group, a neopentyl group, an isopentyl group, an n-hexyl group, a cyclohexyl group, a phenyl group, a methoxymethyl group, a methoxyethyl group, a methoxypropyl group, a methoxybutyl group, a methoxypentyl group, an ethoxymethyl group, an ethoxyethyl group, an ethoxypropyl group, an ethoxybutyl group, an ethoxypentyl group, a trimethylsilyl group, and a t-butyldimethylsilyl group.

Furthermore, in Formula (II), examples of the divalent hydrocarbon group having 2 to 20 carbon atoms in which $R^3$ and $R^4$ are bonded include alkylene groups such as a trimethylene group, a tetramethylene group, a pentamethylene group, and a hexamethylene group; oxyalkylene groups such as an oxydiethylene group and an oxydipropylene group; and nitrogen-containing groups such as a group represented by —CH$_2$CH$_2$—NH—CH$_2$— and a group represented by —CH$_2$CH$_2$—N=CH—.

In Formula (II), the divalent hydrocarbon group having 2 to 20 carbon atoms in which $R^3$ and $R^4$ are bonded preferably has 2 to 16 carbon atoms, more preferably 2 to 10, and yet more preferably 2 to 6 carbon atoms.

In Formula (II), the hydrocarbon group denoted by $R^3$ and $R^4$ is preferably a methyl group, an ethyl group, an n-propyl group, or a trimethylsilyl group. The divalent hydrocarbon group in which $R^3$ and $R^4$ are bonded is preferably a group represented by —CH$_2$CH$_2$—NH—CH$_2$— or a group represented by —CH$_2$CH$_2$—N=CH—.

In Formula (III), X denotes a divalent hydrocarbon group having 1 to 6 carbon atoms and optionally having an oxygen atom. Examples of the hydrocarbon group include an alkylene group and an alkyleneoxy group, and specific examples thereof include an ethylene group, a propylene group, a butylene group, a 1-oxyethylene group, a 1-oxytrimethylene group, and a 1-oxytetramethylene group.

X is preferably a 1-oxytrimethylene group.

In Formula (III), $R^5$ denotes hydrogen or a hydrocarbon group having 1 to 6 carbon atoms. Examples of the hydrocarbon group include an alkyl group and an aryl group, and specific examples thereof include a methyl group, an ethyl group, an n-propyl group, an isopropyl group, an n-butyl group, a sec-butyl group, a t-butyl group, an n-pentyl group, a neopentyl group, an isopentyl group, an n-hexyl group, a cyclohexyl group, and a phenyl group.

$R^5$ is preferably hydrogen or a methyl group.

Examples of the group represented by Formula (II) include an acyclic amino group and a cyclic amino group. Examples of the acyclic amino group include a dimethylamino group, a diethylamino group, an ethylmethylamino group, a di(methoxymethyl)amino group, a di(methoxyethyl)amino group, a di(ethoxymethyl)amino group, a di(ethoxyethyl)amino group, a di(t-butyldimethylsilyl)amino group, and a di(trimethylsilyl)amino group.

Examples of the cyclic amino group include a 1-pyrrolidinyl group, a piperidino group, and a 1-polymethyleneimino group such as a 1-hexamethyleneimino group, a 1-heptamethyleneimino group, a 1-octamethyleneimino group, a 1-decamethyleneimino group, a 1-dodecamethyleneimino group, a 1-tetradecamethyleneimino group, or a 1-octadecamethyleneimino group. Further examples of the cyclic amino group include a 1-imidazolyl group, a 4,5-dihydro-1-imidazolyl group, a 1-imidazolidinyl group, a 1-piperazinyl group, and a morpholino group.

As the group represented by Formula (III), a 3-glycidoxyethyl group, a 3-glycidoxypropyl group, etc. can be cited.

From the viewpoint of economy and ready availability, $A^1$ is preferably a group represented by Formula (II), and more preferably an acyclic amino group.

The conjugated diene polymer of the present invention may comprise, in addition to the conjugated diene-based monomer unit (conjugated diene unit) and the group represented by Formula (I), a monomer unit based on another monomer. Examples of said other monomer include an aromatic vinyl, a vinylnitrile, and an unsaturated carboxylic acid ester. Examples of the aromatic vinyl include styrene, α-methylstyrene, vinyltoluene, vinylnaphthalene, divinylbenzene, trivinylbenzene, and divinylnaphthalene. Examples of the vinylnitrile include acrylonitrile, and examples of the unsaturated carboxylic acid ester include methyl acrylate, ethyl acrylate, methyl methacrylate, and ethyl methacrylate. Among them, styrene is preferable from the viewpoint of ready availability.

The conjugated diene polymer of the present invention preferably comprises an aromatic vinyl-based monomer unit (aromatic vinyl unit) from the viewpoint of mechanical strength being enhanced, and the content of the aromatic vinyl unit, relative to 100 wt % of the total amount of the conjugated diene unit and the aromatic vinyl unit, is preferably at least 10 wt % (the content of the conjugated diene unit being no greater than 90 wt %), and more preferably at least 15 wt % (the content of the conjugated diene unit being no greater than 85 wt %). Furthermore, from the viewpoint of good fuel economy, the content of the aromatic vinyl unit is preferably no greater than 50 wt % (the content of the conjugated diene unit being at least 50 wt %), and more preferably no greater than 45 wt % (the content of the conjugated diene unit being at least 55 wt %).

The conjugated diene polymer of the present invention is a polymer for which at least peaks H, M, and L below are present in a molecular weight distribution curve obtained by gel permeation chromatography measurement.

Peak H: a peak for which the molecular weight at the peak top is higher than the molecular weight at the peak top of peak M.

Peak M: a peak for which, when the molecular weight at the peak top of peak H is MH, the molecular weight at the peak top is 0.6×MH to 0.8×MH.

Peak L: a peak for which, when the molecular weight at the peak top of peak H is MH, the molecular weight at the peak top is 0.2×MH to 0.4×MH.

Preferably, peak H is a peak on the highest molecular weight side in the molecular weight distribution curve.

The gel permeation chromatography may be carried out in accordance with conditions described in Examples.

When the conjugated diene polymer of the present invention is produced by a production method comprising steps 1, 2, and 3 described below, it is surmised that a component appearing as peak H is a polymer formed by reaction of 1 mole of a silicon compound represented by Formula (IV) below and 3 moles of a conjugated diene polymer having a terminal alkali metal catalyst derived-alkali metal, a component appearing as peak M is a polymer formed by reaction of 1 mole of a silicon compound represented by Formula (IV) and 2 moles of a conjugated diene polymer having a terminal alkali metal catalyst derived-alkali metal, and a component appearing as peak L is a polymer formed by reaction of 1 mole of a silicon compound represented by Formula (IV) and 1 mole of a conjugated diene polymer having a terminal alkali metal catalyst derived-alkali metal and/or a polymer formed by reaction of a conjugated diene polymer having a terminal alkali metal catalyst derived-alkali metal and a catalyst deactivator. For the conjugated diene polymer of the present invention, the ratio of these components is in a specific range.

From the viewpoint of processability being enhanced, when the total area of the molecular weight distribution curve is 100%, the total peak area of peak H is at least 3%, and preferably at least 5%. From the viewpoint of good fuel economy, the peak area is no greater than 30%, and preferably no greater than 25%.

Furthermore, the molecular weight at the peak top of peak H is preferably 400,000 to 1,000,000, and more preferably 550,000 to 850,000. It is preferable for the molecular weight at the peak top of peak H to be in the above-mentioned range since the balance between processability and strength is good.

From the viewpoint of processability being enhanced, when the total area of the molecular weight distribution curve is 100%, the total peak area of peak M is at least 5%, and preferably at least 10%. From the viewpoint of good fuel economy, the peak area is no greater than 45%, and preferably no greater than 40%.

From the viewpoint of good fuel economy, when the total area of the molecular weight distribution curve is 100%, the total peak area of peak L is at least 40%, and preferably at least 50%. From the viewpoint of processability being enhanced, the total peak area is no greater than 80%, and preferably no greater than 70%.

When, in the molecular weight distribution curve obtained by gel permeation chromatography measurement, the peak curve does not drop to the baseline, that is, when a target peak overlaps an adjacent peak, peak area is determined by providing a perpendicular line from a minimum point of the curve between the peak top of the target peak and the peak top of the adjacent peak to the baseline, and using this perpendicular line as a boundary between the target peak and the adjacent peak.

From the viewpoint of mechanical strength being enhanced, the Mooney viscosity ($ML_{1+4}$) of the conjugated diene polymer of the present invention is preferably at least 10, and more preferably at least 20. Furthermore, from the viewpoint of processability being enhanced, it is preferably no greater than 200, and more preferably no greater than 150. The Mooney viscosity ($ML_{1+4}$) is measured at 100° C. in accordance with JIS K6300 (1994).

From the viewpoint of good fuel economy, the amount of vinyl bonds of the conjugated diene polymer of the present invention is preferably no greater than 70 mole % when the content of the conjugated diene unit is 100 mole %, and more preferably no greater than 60 mole %. Furthermore, from the viewpoint of tire grip performance being enhanced, it is preferably at least 10 mole %, and more preferably at least 15 mole %. The amount of vinyl bonds may be obtained by IR spectroscopy from absorption intensity at around 910 cm$^{-1}$, which is the absorption peak of a vinyl group.

As a method for producing the conjugated diene polymer of the present invention, a production method comprising steps 1, 2, and 3 below can be cited.

(Step 1): a step of polymerizing a conjugated diene-containing monomer in a hydrocarbon solvent in the presence of an alkali metal catalyst, thus giving a conjugated diene polymer having a terminal catalyst-derived alkali metal;

(step 2): a step of adding a silicon compound represented by Formula (IV) below in an amount of 0.05 to 0.35 moles per mole of alkali metal of the alkali metal catalyst used in step 1 to the hydrocarbon solution of the conjugated diene polymer of step 1 and mixing; and (step 3): a step of adding to the hydrocarbon solution of the conjugated diene polymer of step 2 the silicon compound represented by Formula (IV) below in an amount that together with the amount added in step 2 makes the total amount at least 0.5 moles per mole of alkali metal of the alkali metal catalyst used in step 1 and mixing.

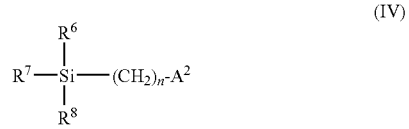

(In Formula (IV), $R^6$, $R^7$, and $R^8$ independently denote a hydrocarbon group having 1 to 4 carbon atoms or a hydrocarbonoxy group having 1 to 4 carbon atoms, at least one of $R^6$, $R^7$, and $R^8$ is a hydrocarbonoxy group having 1 to 4 carbon atoms, n denotes an integer of 0 to 10, and $A^2$ denotes a polar functional group that does not have an active hydrogen).

That is, the conjugated diene polymer of the present invention is preferably a modified conjugated diene polymer obtained by reacting, with a silicon compound represented by Formula (IV), a conjugated diene polymer obtained by polymerization in a hydrocarbon solvent in the presence of an alkali metal catalyst.

Examples of the alkali metal catalyst used in step 1 include an alkali metal, an organoalkali metal compound, a complex between an alkali metal and a polar compound, and an oligomer having an alkali metal. Examples of the alkali metal include lithium, sodium, potassium, rubidium, and cesium. Examples of the organoalkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. Examples of the complex between an alkali metal and a polar compound include a potassium-tetrahydrofuran complex and a potassium-diethoxyethane complex, and examples of the oligomer having an alkali metal include the sodium salt of α-methylstyrene tetramer. Among them, an organolithium compound or organosodium compound is preferable, and an organolithium compound or an organosodium compound having 2 to 20 carbon atoms is more preferable.

The hydrocarbon solvent used in step 1 is a solvent that does not deactivate the alkali metal catalyst, and examples thereof include an aliphatic hydrocarbon, an aromatic hydrocarbon, and an alicyclic hydrocarbon. Specific examples of the aliphatic hydrocarbon include propane, n-butane, isobutane, n-pentane, iso-pentane, n-hexane, propene, 1-butene, iso-butene, trans-2-butene, cis-2-butene, 1-pentene, 2-pentene, 1-hexene, and 2-hexene. Specific examples of the aromatic hydrocarbon include benzene, toluene, xylene, and ethylbenzene, and specific examples of the alicyclic hydrocarbon include cyclopentane and cyclohexane. They may be used on their own or in a combination of two or more types. Among them, a hydrocarbon having 2 to 12 carbon atoms is preferable.

In step 1, a conjugated diene-containing monomer is polymerized to thus produce a conjugated diene polymer having a terminal alkali metal catalyst-derived alkali metal. Examples of the conjugated diene include 1,3-butadiene, isoprene, 1,3-pentadiene, 2,3-dimethyl-1,3-butadiene, and 1,3-hexadiene, and they may be used on their own or in a combination of two or more types. Among them, from the viewpoint of ready availability, 1,3-butadiene and isoprene are preferable.

In step 1, polymerization may be carried out using the conjugated diene on its own or polymerization may be carried out using a combination of the conjugated diene and another monomer. Examples of said other monomer include an aromatic vinyl, a vinylnitrile, and an unsaturated carboxylic acid ester. Specific examples of the aromatic vinyl include styrene, α-methylstyrene, vinyltoluene, vinylnaphthalene, divinylbenzene, trivinylbenzene, and divinylnaphthalene. Specific examples of the vinylnitrile include acrylonitrile, and specific examples of the unsaturated carboxylic acid ester include methyl acrylate, ethyl acrylate, methyl methacrylate, and ethyl methacrylate. Among them, from the viewpoint of ready availability, styrene is preferable.

The polymerization in step 1 may be carried out in the presence of an agent for adjusting the amount of vinyl bonds of the conjugated diene unit, an agent for adjusting the distribution in the conjugated diene polymer chain of the conjugated diene unit and a monomer unit based on a monomer other than the conjugated diene (hereafter, generally called 'adjusting agents'), etc. Examples of such agents include an ether compound, a tertiary amine, and a phosphine compound. Specific examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Specific examples of the tertiary amine include triethylamine, tripropylamine, tributylamine, N,N,N',N'-tetramethylethylenediamine, N,N-diethylaniline, pyridine, and quinoline. Specific examples of the phosphine compound include trimethylphosphine, triethylphosphine, and triphenylphosphine. They may be used on their own or in a combination of two or more types.

The polymerization temperature in step 1 is normally 0° C. to 100° C., and preferably 35° C. to 65° C., and the polymerization time is normally 10 minutes to 5 hours.

In step 2, a silicon compound represented by Formula (IV) below is added to a hydrocarbon solution of the conjugated diene polymer having a terminal alkali metal obtained in step 1 and mixed to thus modify the conjugated diene polymer with the silicon compound.

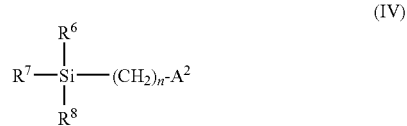

(In Formula (IV), $R^6$, $R^7$, and $R^8$ independently denote a hydrocarbon group having 1 to 4 carbon atoms or a hydrocarbonoxy group having 1 to 4 carbon atoms, at least one of $R^6$, $R^7$, and $R^8$ is a hydrocarbonoxy group having 1 to 4 carbon atoms, n denotes an integer of 0 to 10, and $A^2$ denotes a polar functional group that does not have an active hydrogen).

$R^6$, $R^7$, and $R^8$ independently denote a hydrocarbon group having 1 to 4 carbon atoms or a hydrocarbonoxy group having 1 to 4 carbon atoms. At least one of $R^6$, $R^7$, and $R^8$ is a hydrocarbonoxy group having 1 to 4 carbon atoms, and preferably all of $R^6$, $R^7$, and $R^8$ are hydrocarbonoxy groups having 1 to 4 carbon atoms.

The hydrocarbon group having 1 to 4 carbon atoms denoted by $R^6$, $R^7$, and $R^8$ is preferably an alkyl group, and examples thereof include a methyl group, an ethyl group, an n-propyl group, an isopropyl group, an n-butyl group, a sec-butyl group, and a t-butyl group. As the hydrocarbon group, a methyl group or an ethyl group is preferable. The hydrocarbonoxy group having 1 to 4 carbon atoms denoted by $R^1$, $R^2$, and $R^3$ is preferably an alkoxy group, and examples thereof include a methoxy group, an ethoxy group, an n-propoxy group, an isopropoxy group, an n-butoxy group, a sec-butoxy group, and a t-butoxy group. As the hydrocarbonoxy group, a methoxy group or an ethoxy group is preferable.

n denotes an integer of 0 to 10. From the viewpoint of good fuel economy, it is preferably at least 3, and from the viewpoint of economy in production being enhanced, it is preferably no greater than 4.

$A^2$ denotes a polar functional group that does not have an active hydrogen, and examples thereof include a group represented by Formula (II) below and a group represented by Formula (III) below.

(In Formula (II), $R^3$ and $R^4$ independently denote a hydrocarbon group having 1 to 8 carbon atoms and optionally having a nitrogen atom, an oxygen atom, or a silicon atom, or $R^3$ and $R^4$ are bonded and represent a divalent hydrocarbon group having 2 to 20 carbon atoms and optionally having a nitrogen atom, an oxygen atom, or a silicon atom).

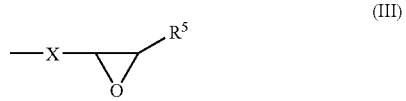

(In Formula (III), X denotes a divalent hydrocarbon group having 1 to 6 carbon atoms and optionally having an oxygen atom, and $R^5$ denotes hydrogen or a hydrocarbon group having 1 to 6 carbon atoms).

In Formula (IV), examples of the group represented by Formula (II), the group represented by Formula (III), $R^3$, $R^4$, $R^5$, and X in $A^2$ are the same as respective examples of the group represented by Formula (II), the group represented by Formula (III), $R^3$, $R^4$, $R^5$, and X in $A^1$ of Formula (I), and preferred groups of the group represented by Formula (II), the group represented by Formula (III), $R^3$, $R^4$, $R^5$, and X are the same as respective preferred groups of the group represented by Formula (II), the group represented by Formula (III), $R^3$, $R^4$, $R^5$, and X in $A^1$. Preferred groups for $A^2$ are the same as preferred groups for $A^1$.

With regard to the silicon compound represented by Formula (IV), examples of compounds in which $A^2$ is an acyclic amino group represented by Formula (II) include [3-(dimethylamino)propyl]trimethoxysilane, [3-(diethylamino)propyl]trimethoxysilane, [3-(dimethylamino)propyl]triethoxysilane, [3-(diethylamino)propyl]triethoxysilane, [(3-methyl-3-ethylamino)propyl]trimethoxysilane, [(3-methyl-3-ethylamino)propyl]triethoxysilane, [3-(dimethylamino)propyl]methyldimethoxysilane, [3-(diethylamino)propyl]methyldimethoxysilane, [3-(dimethylamino)propyl]ethyldimethoxysilane, [3-(diethylamino)propyl]ethyldimethoxysilane, [3-(dimethylamino)propyl]dimethylmethoxysilane, [3-(diethylamino)propyl]dimethylmethoxysilane, [3-(dimethylamino)propyl]diethylmethoxysilane, [3-(diethylamino)propyl]diethylmethoxysilane, [3-(dimethylamino)propyl]dimethylmethoxysilane, [3-(ethylmethylamino)propyl]diethylmethoxysilane, [3-(ethylmethylamino)propyl]methyldimethoxysilane, [3-(dimethylamino)propyl]ethyldimethoxysilane, [3-(diethylamino)propyl]methyldiethoxysilane, [3-(dimethylamino)propyl]methyldiethoxysilane, [3-(diethylamino)propyl]ethyldiethoxysilane, [3-(dimethylamino)propyl]ethyldiethoxysilane, [3-(diethylamino)propyl]dimethylethoxysilane, [3-(dimethylamino)propyl]diethylethoxysilane, [3-(diethylamino)propyl]dimethylethoxysilane, [(3-methyl-3-ethylamino)propyl]diethylethoxysilane, [(3-methyl-3-ethylamino)propyl]methyldiethoxysilane, [3-(ethylmethylamino)propyl]ethyldiethoxysilane, [3-(dimethoxymethylamino)propyl]trimethoxysilane, [3-(dimethoxyethylamino)propyl]trimethoxysilane, [3-(dimethoxymethylamino)propyl]triethoxysilane, [3-(dimethoxyethylamino)propyl]triethoxysilane, [3-(diethoxymethylamino)propyl]trimethoxysilane, [3-(diethoxymethylamino)propyl]trimethoxysilane, [3-(diethoxymethylamino)propyl]triethoxysilane, {3-[di(trimethylsilyl)amino]propyl}trimethoxysilane, {3-[di(trimethylsilyl)amino]propyl}triethoxysilane, {3-[di(t-butyldimethylsilyl)amino]propyl}trimethoxysilane, {3-[di(t-butyldimethylsilyl)amino]propyl}triethoxysilane, {3-[di(trimethylsilyl)amino]propyl}methyldimethoxysilane, {3-[di(trimethylsilyl)amino]propyl}methyldiethoxysilane, {3-[di(t-butyldimethylsilyl)amino]propyl}methyldimethoxysilane, {3-[di(t-butyldimethylsilyl)amino]

propyl}methyldiethoxysilane, {3-[di(trimethylsilyl)amino] propyl}dimethylmethoxysilane, {3-[di(trimethylsilyl) amino]propyl}dimethylethoxysilane, {3-[di(t-butyldimethylsilyl)amino]propyl}dimethylmethoxysilane, {3-[di(t-butyldimethylsilyl)amino] propyl}dimethylethoxysilane, [3-(ethylmethylamino)propyl]trimethoxysilane, [3-(ethylmethylamino)propyl]triethoxysilane, [3-(ethylmethylamino)propyl] methyldimethoxysilane, [3-(ethylmethylamino)propyl] ethyldimethoxysilane, [3-(ethylmethylamino)propyl] methyldiethoxysilane, and [3-(ethylmethylamino)propyl] dimethylethoxysilane.

From the viewpoint of good fuel economy, the silicon compound in which $A^2$ is an acyclic amino group represented by Formula (II) is preferably [3-(dimethylamino)propyl]trimethoxysilane, [3-(diethylamino)propyl]trimethoxysilane, [3-(dimethylamino)propyl]triethoxysilane, or [3-(diethylamino)propyl]triethoxysilane.

With regard to the silicon compound represented by Formula (IV), examples of compounds in which $A^2$ is a cyclic amino group represented by Formula (II) include 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, and 3-hexamethyleneiminopropylethyldiethoxysilane.

From the viewpoint of good fuel economy, the silicon compound in which $A^2$ is a cyclic amino group represented by Formula (II) is preferably N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, or N-(3-triethoxysilylpropyl)-4,5-imidazole.

With regard to the silicon compound represented by Formula (IV), examples of silicon compounds in which $A^2$ is a group represented by Formula (III) include 3-glycidoxypropyltrimethoxysilane, 3-glycidoxypropyltriethoxysilane, 3-glycidoxypropylmethyldimethoxysilane, 3-glycidoxypropylethyldimethoxysilane, 3-glycidoxypropylmethyldiethoxysilane, and 3-glycidoxypropylethyldiethoxysilane.

From the viewpoint of good fuel economy, the compound being readily available, and long-term storage stability being enhanced, the silicon compound in which $A^2$ is a group represented by Formula (III) is preferably 3-glycidoxypropyltrimethoxysilane.

From the viewpoint of increasing the peak area of peak H the amount of silicon compound represented by Formula (IV) added in step 2 is preferably 0.05 to 0.35 moles per mole of alkali metal of the alkali metal catalyst used in step 1, and more preferably 0.1 to 0.3 moles.

The speed of addition of the silicon compound represented by Formula (IV) in step 2 is normally at least 5 to 10.000 mmole/sec/m³ per unit volume of hydrocarbon solvent per unit time. From the viewpoint of increasing the peak area of peak H, the lower the speed of addition the better.

Addition of the silicon compound represented by Formula (IV) in step 2 is normally carried out to the hydrocarbon solution while stirring. The speed at which the hydrocarbon solution is stirred is normally 30 to 400 rpm. From the viewpoint of increasing the peak area of peak H, the lower the stirring speed the better.

The temperature of the hydrocarbon solution when the silicon compound represented by Formula (IV) is added in step 2 is normally 0° C. to 100° C.

In step 2, it is preferable to stir the hydrocarbon solution after the silicon compound represented by Formula (IV) is added. The stirring speed is normally at least 100 rpm, the temperature is normally at least 35° C., and the time is normally 1 sec to 30 minutes. From the viewpoint of increasing the peak area of peak H, the higher the temperature and the longer the time the better.

The silicon compound may be dissolved in a solvent such as tetrahydrofuran or hexane that does not deactivate the alkali metal catalyst, and added as a solution to the hydrocarbon solution.

The concentration of the conjugated diene polymer in the hydrocarbon solution prior to addition of the silicon compound in step 2 is normally 5 to 30 wt %. From the viewpoint of increasing the total peak area of peak L, the lower the concentration the better. From the viewpoint of increasing the peak area of peak H, the higher the concentration the better.

In step 3, the silicon compound represented by Formula (IV) is further added to the hydrocarbon solution of the conjugated diene polymer obtained in step 2 and mixed to thus modify the conjugated diene polymer with the silicon compound.

From the viewpoint of increasing the total peak area of peak L, the amount of silicon compound represented by Formula (IV) added in step 3, as a total amount with the amount added in step 2, is preferably at least 0.5 moles per mole of alkali metal of the alkali metal catalyst used in step 1, and more preferably at least 1 mole. From the viewpoint of economy during production being enhanced, the amount added is preferably no greater than 10 moles, and more preferably no greater than 5 moles.

The speed of addition of the silicon compound represented by Formula (IV) in step 3 is normally at least 5 to 10.000 mmole/sec/m³ per unit volume of hydrocarbon solvent per unit time. From the viewpoint of increasing the total peak area of peak L, the higher the speed of addition the better, and from the viewpoint of increasing the total peak area of peak M, the lower the speed of addition the better.

Addition of the silicon compound represented by Formula (IV) in step 3 is normally carried out to the hydrocarbon solution while stirring. The speed at which the hydrocarbon solution is stirred is normally 30 to 400 rpm. From the viewpoint of increasing the total peak area of peak L, the higher the stirring speed the better, and from the viewpoint of increasing the total peak area of peak M, the lower the stirring speed the better.

The temperature of the hydrocarbon solution when the silicon compound represented by Formula (IV) is added in step 3 is normally 0° C. to 100° C.

The silicon compound may be dissolved in a solvent such as tetrahydrofuran or hexane that does not deactivate the alkali metal catalyst and added as a solution to the hydrocarbon solution.

The conjugated diene polymer may be recovered from the hydrocarbon solution of the conjugated diene polymer after the treatment of step 2 by a known recovery method such as, for example, (1) a method in which a coagulant is added to the hydrocarbon solution of the conjugated diene polymer or (2) a method in which steam is added to the hydrocarbon solution of the conjugated diene polymer. The conjugated diene polymer thus recovered may be dried by a known dryer such as a band dryer or an extrusion dryer.

The conjugated diene polymer of the present invention may be used in a conjugated diene polymer composition by combining another rubber component therewith. Examples of said other rubber component include conventional styrene-butadiene copolymer rubber, polybutadiene rubber, butadiene-isoprene copolymer rubber, and butyl rubber. Examples further include natural rubber, ethylene-propylene copolymer rubber, and ethylene-octene copolymer rubber. These components may be used in a combination of two or more types.

In the case where another rubber component is combined with the conjugated diene polymer of the present invention, from the viewpoint of good fuel economy, the amount of conjugated diene polymer of the present invention combined, when the total amount of rubber components combined is 100 parts by weight, is preferably at least 10 parts by weight, and preferably at least 20 parts by weight.

Furthermore, the conjugated diene polymer of the present invention may be used in a conjugated diene polymer composition by combining it with an additive, etc. As the additive, a known additive may be used, and examples thereof include a vulcanizing agent such as sulfur; a vulcanization accelerator such as a thiazole-based vulcanization accelerator, a thiuram-based vulcanization accelerator, or a sulfenamide-based vulcanization accelerator; a vulcanization activator such as stearic acid or zinc oxide; an organic peroxide; a reinforcing agent such as silica or carbon black; a filler such as calcium carbonate or talc; a silane coupling agent; an extender oil; a processing aid; an antioxidant; and a lubricant.

When a conjugated diene polymer composition in which a reinforcing agent is combined with the conjugated diene polymer of the present invention is used, it is preferable to use silica as the reinforcing agent.

When a conjugated diene polymer composition is formed by combining silica with the conjugated diene polymer of the present invention, the amount of silica combined, relative to 100 parts by weight of the rubber component (the total amount of the conjugated diene polymer of the present invention and other rubber components), is normally 10 to 150 parts by weight. From the viewpoint of good fuel economy, the amount combined is preferably at least 20 parts by weight, and more preferably at least 30 parts by weight. From the viewpoint of reinforcement being enhanced, it is preferably no greater than 120 parts by weight, and more preferably no greater than 100 parts by weight.

When a reinforcing agent other than silica is combined with the conjugated diene polymer of the present invention, from the viewpoint of good fuel economy, the amount combined of the reinforcing agent other than silica, relative to 100 parts by weight of the total amount combined of the reinforcing agents, is preferably no greater than 50 parts by weight, and more preferably no greater than 30 parts by weight. From the viewpoint of reinforcement being enhanced, it is preferably at least 1 part by weight, and more preferably at least 3 parts by weight. As the reinforcing agent other than silica, carbon black is preferable.

As a method for producing a conjugated diene polymer composition by combining another rubber component, an additive, etc. with the conjugated diene polymer of the present invention, a known method such as, for example, a method in which each component is kneaded by means of a known mixer such as a roll or a Banbury mixer can be used.

As a method for producing a composition comprising the conjugated diene polymer of the present invention combined with silica, a production method comprising step 4 below in addition to the above-mentioned steps 1, 2, and 3 can be cited.

Step 4: a step of combining the conjugated diene polymer obtained in step 3 with silica In step 4, another rubber component, another additive, etc. may be combined. As a method of combining in step 4, a known method such as, for example, a method in which each component is kneaded by means of a known mixer such as a roll or a Banbury mixer can be used.

With regard to kneading conditions in step 4, when an additive other than a vulcanizing agent or a vulcanization accelerator is combined, the kneading temperature is normally 50° C. to 200° C., and preferably 80° C. to 190° C., and the kneading time is normally 30 sec to 30 min, and preferably 1 min to 30 min. When a vulcanizing agent or a vulcanization accelerator is combined, the kneading temperature is normally no greater than 100° C., and preferably room temperature to 80° C. A composition in which a vulcanizing agent or a vulcanization accelerator is combined may be used by carrying out a vulcanization treatment such as press vulcanization. The vulcanization temperature is normally 120° C. to 200° C., and preferably 140° C. to 180° C.

In step 4, the amount of the conjugated diene polymer obtained in step 3 combined, the amount of silica combined, the amount of other polymer component combined, and the amount of filler other than silica combined are preferably the above-mentioned amounts combined.

The conjugated diene polymer and the conjugated diene polymer composition of the present invention have excellent processability. Furthermore, their fuel economy is good. Moreover, they have good grip performance, wear resistance, strength, etc.

The conjugated diene polymer and the conjugated diene polymer composition of the present invention are used for tires, soles, flooring materials, vibration isolating materials, etc., and are particularly suitably used for tires.

In accordance with the present invention, there can be provided a conjugated diene polymer that can give a polymer composition having excellent processability and good fuel economy even when silica is used as a reinforcing agent, a method for producing the conjugated diene polymer, and a polymer composition comprising the conjugated diene polymer combined with silica.

EXAMPLES

The present invention is explained below by reference to Examples.

Physical properties were measured by the following methods.

1. Mooney Viscosity ($ML_{1+4}$)

Measured at 100° C. in accordance with JIS K6300 (1994).

2. Vinyl Content (Units: Mol %)

Determined by IR spectroscopy from absorption intensity at around 910 cm$^{-1}$, which is the absorption peak of a vinyl group.

3. Styrene Unit Content (Units: Wt %)

Determined from refractive index in accordance with JIS K6383 (1995).

4. Molecular Weight Distribution Curve

Measured under conditions (1) to (8) below by a gel permeation chromatograph (GPC) method.

(1) Instrument: HLC-8020 manufactured by Tosoh Corporation
(2) Separation column: GMH-XL (2 columns in tandem) manufactured by Tosoh Corporation
(3) Measurement temperature: 40° C.
(4) Carrier: tetrahydrofuran
(5) Flow rate: 0.6 mL/min
(6) Amount injected: 5 μL
(7) Detector: differential refractometer
(8) Molecular weight standard: standard polystyrene 5. Fuel Economy 100 parts by weight of a polymer, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon, 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), 2 parts by weight of stearic acid, 2 parts by weight of zinc oxide, 1.5 parts by weight of a wax (product name: Sunnoc N, manufactured by Ouchi Shinko Chemical Industrial Co., Ltd.), 1.4 parts by weight of sulfur, and 2 parts by weight of a vulcanization accelerator (1 part by weight each of product names Soxinol CZ and Soxinol D, manufactured by Sumitomo Chemical Co., Ltd.) were kneaded to give a composition. The composition thus obtained was molded into a sheet using a two roll machine, the sheet was heated at 160° C. for 45 minutes to thus effect vulcanization, and a vulcanized sheet was obtained.

A loss tangent (tan δ (70° C.)) at 70° C. of the vulcanized sheet was measured using a viscoelastometer (Ueshima Seisakusho) under conditions of a strain of 1% and a frequency of 10 Hz. The smaller this value, the better the fuel economy.

6. Processability 100 parts by weight of a polymer, 78.4 parts by weight of silica (product name: Ultrasil VN3-G, manufactured by Degussa, Inc.), 6.4 parts by weight of a silane coupling agent (product name: Si69, manufactured by Degussa, Inc.), 6.4 parts by weight of carbon, 47.6 parts by weight of an extender oil (product name: X-140, manufactured by Kyodo Sekiyu), 1.5 parts by weight of an antioxidant (product name: Antigene 3C, manufactured by Sumitomo Chemical Co., Ltd.), and 2 parts by weight of stearic acid were kneaded by means of a Labo Plastomill, 2 parts by weight of zinc oxide, and 1.5 parts by weight of a wax (product name: Sunnoc N, manufactured by Ouchi Shinko Chemical Industrial Co., Ltd.) were added and kneaded, and the composition thus obtained was molded into a sheet using a two roll machine (roll gap 2.5 mm, roll diameter 10 inches).

The appearance of the edge of the sheet thus obtained was examined and evaluated using the criteria below. The larger the number, the better the processability.

5: Very little unevenness, and there was a smooth portion of at least 10 cm.
4: Little unevenness, and there was a smooth portion of at least 7 cm.
3: Some unevenness, but there was a smooth portion of at least 5 cm.
2: Much unevenness, but there was a smooth portion of about 3 cm.
1: Much unevenness, and no smooth portion could be observed.

Example 1

A 20 L capacity stainless polymerization reactor was washed, dried, flushed with dry nitrogen, and then charged with 10.2 kg of hexane (specific gravity 0.68 g/cm$^3$), 461 g of 1,3-butadiene, 259 g of styrene, 6.1 mL of tetrahydrofuran, and 3.3 mL of ethylene glycol diethyl ether. Subsequently, 13.7 mmol of n-butyllithium was poured in as an n-hexane solution, the temperature of the interior of the polymerization reactor was adjusted to 65° C., 1,3-butadiene and styrene were supplied to the polymerization reactor, and polymerization was carried out for 3 hours, thus giving a polymer solution. The amount of 1,3-butadiene supplied during the 3 hours of polymerization was 691 g, and the amount of styrene supplied was 389 g.

The polymer solution thus obtained was stirred at a stirring speed of 130 rpm, a solution of 2.4 mmol of 3-(diethylamino)propyltrimethoxysilane dissolved in 10 mL of hexane was added to the polymer solution in 1 sec, and the polymer solution was stirred for 15 minutes.

Following this, the polymer solution thus obtained was stirred at a stirring speed of 130 rpm, a solution of 9.6 mmol of 3-(diethylamino)propyltrimethoxysilane in 10 mL of hexane was added to the polymer solution in 1 sec, and the polymer solution was stirred for 60 minutes. 10 mL of methanol was added to the polymer solution, and the polymer solution was stirred for a further 5 minutes.

To the polymer solution were added 8 g of 2-tert-butyl-6-(3-tert-butyl-2-hydroxy-5-methylbenzyl)-4-methylphenyl acrylate (product name: Sumilizer GM, manufactured by Sumitomo Chemical Co., Ltd.), and 4 g of pentaerythrityl tetrakis(3-laurylthiopropionate) (product name: Sumilizer TP-D, manufactured by Sumitomo Chemical Co., Ltd.). Subsequently, the polymer solution was evaporated at normal temperature for 24 hours, and further dried under vacuum at 55° C. for 12 hours, thus giving a polymer. The results of measurement of the physical properties of the polymer and the physical properties of a composition employing the polymer are given in Table 1.

Furthermore, the result of measurement by gel permeation chromatography of the polymer obtained in Example 1 is shown in FIG. 1.

Example 2

The procedure of Example 1 was repeated except that the amount of n-butyllithium added was changed from 13.7 mmol to 15.5 mmol, instead of the solution of 2.4 mmol of 3-(diethylamino)propyltrimethoxysilane dissolved in 10 mL of hexane a solution of 2.7 mmol of 3-(diethylamino)propyltrimethoxysilane dissolved in 10 mL of hexane was used, and instead of the solution of 9.6 mmol of 3-(diethylamino)propyltrimethoxysilane dissolved in 10 mL of hexane, a solution of 10.7 mmol of 3-(diethylamino)propyltrimethoxysilane dissolved in 10 mL of hexane was used. The results of measurement of the physical properties of the polymer and the physical properties of a composition employing the polymer are given in Table 1.

Figure 2:
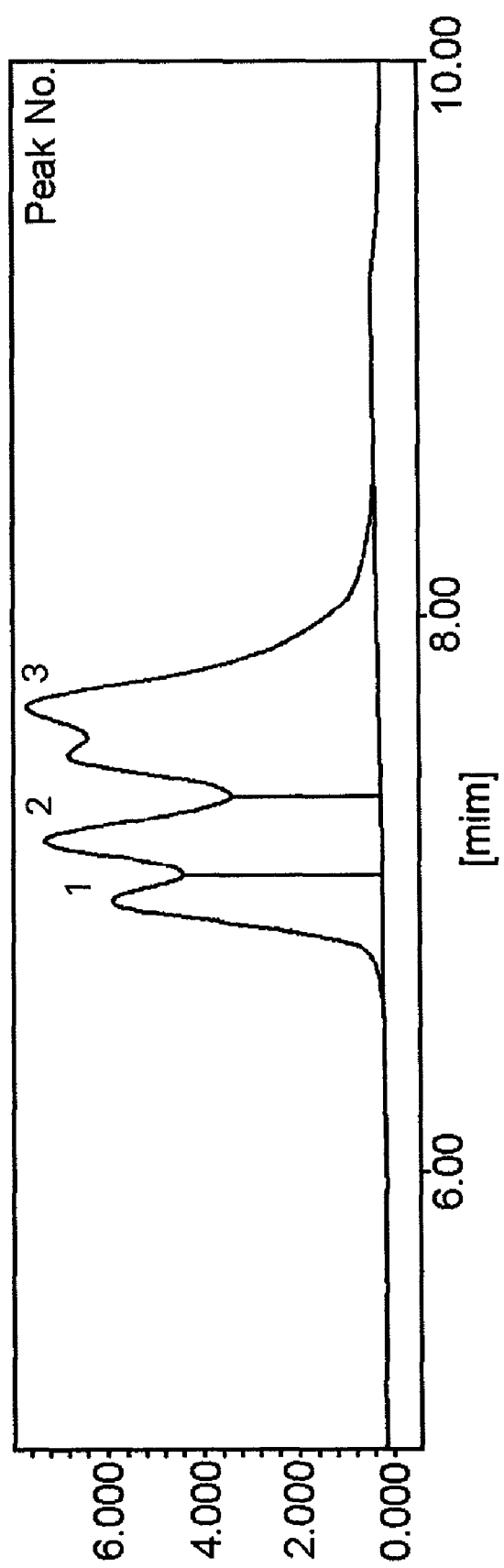
FIG. 2 shows the result of measurement by gel permeation chromatography of the polymer obtained in Example 2.

Furthermore, the result of measurement by gel permeation chromatography of the polymer obtained in Example 2 is shown in FIG. 2.

Comparative Example

A 20 L capacity stainless polymerization reactor was washed, dried, flushed with dry nitrogen, and then charged with 1404 g of 1,3-butadiene, 396 g of styrene, 122 g of tetrahydrofuran, 10.2 kg of hexane, and 11.0 mmol of n-butyllithium (n-hexane solution), and polymerization was carried out at 65° C. for 3 hours while stirring, thus giving a polymerization mixture.

11.0 mmol of 3-(diethylamino)propyltrimethoxysilane was added to the polymerization mixture and reacted for 60 minutes while stirring, and 10 mL of methanol was then added thereto and stirred for a further 5 minutes, thus giving a reaction mixture.

The reaction mixture was taken out, 10 g of 2,6-di-t-butyl-p-cresol (product name: Sumilizer BHT, manufactured by Sumitomo Chemical Co., Ltd.) was added thereto, the majority of the hexane was evaporated, and drying was carried out at 55° C. for 12 hours under vacuum, thus giving a polymer. The results of measurement of the physical properties of the polymer and the physical properties of a composition employing the polymer are given in Table 1.

Figure 3:
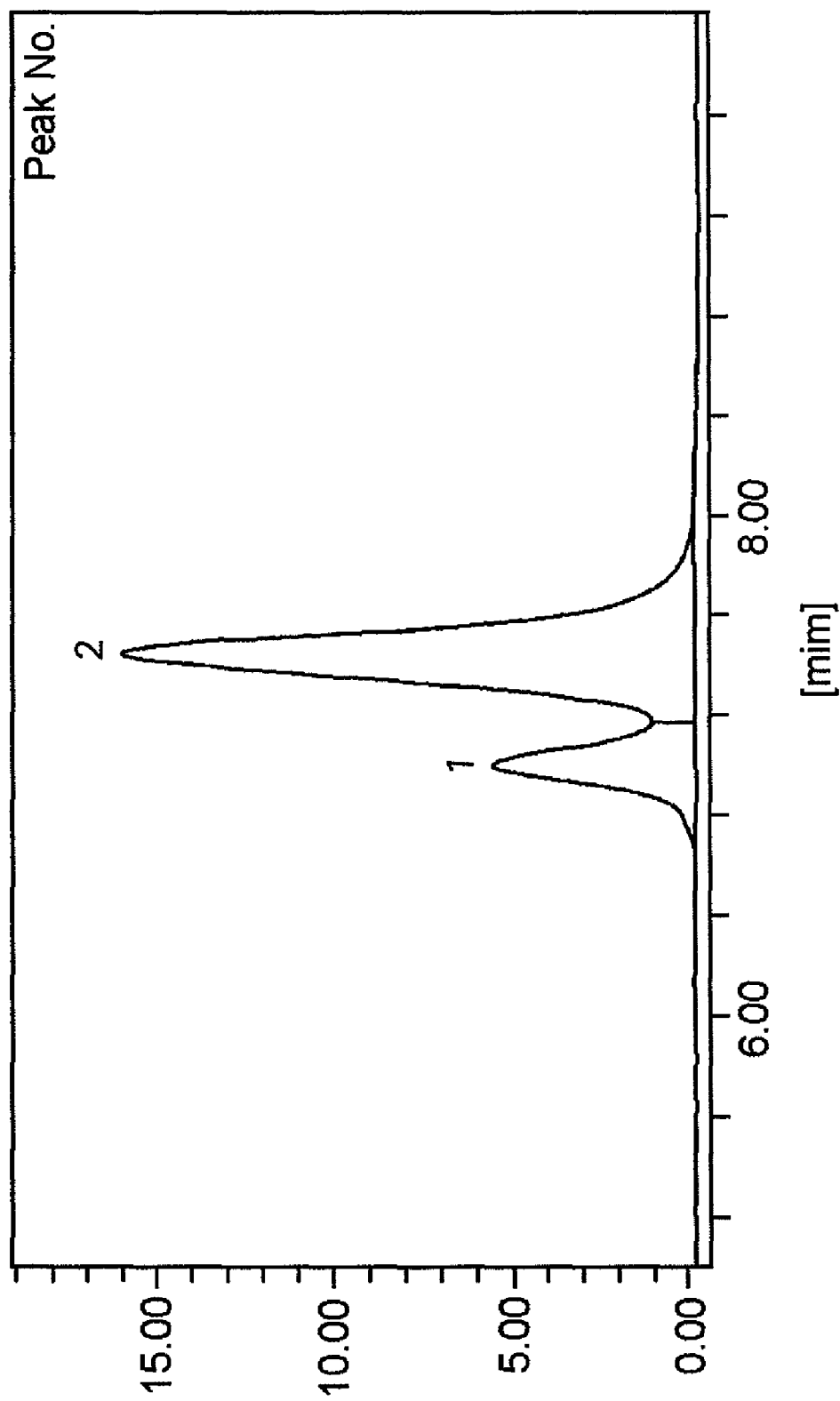
FIG. 3 shows the result of measurement by gel permeation chromatography of the polymer obtained in the Comparative Example.

Furthermore, the result of measurement by gel permeation chromatography of the polymer obtained in the Comparative Example is shown in FIG. 3.

TABLE 1

|  |  | Example 1 | Example 2 | Comp. Ex. |
|---|---|---|---|---|
| Polymer |  |  |  |  |
| Mooney viscosity |  | — | 69 | 55 | 59 |
| Vinyl content | % | 50 | 50 | 58 |
| Styrene unit content | wt % | 36 | 35 | 23 |
| Molecular weight distribution curve |  |  |  |  |
| Number of peak tops |  | 4 | 4 | 2 |
| Molecular weight of peak top (peak area) | ×10$^4$ (%) | 61.1 (15) | 52.4 (18) | 56 (22) |
| Molecular weight of peak top (peak area) | ×10$^4$ (%) | 39.5 (27) | 34.2 (26) | 22 (78) |
| Molecular weight of peak top (peak area) | ×10$^4$ (%) | 15.4, 21.6 (58) | 13.5, 18.9 (57) | — |
| Composition |  |  |  |  |
| Fuel economy tanδ (70° C.) |  | 0.142 | 0.143 | N.D. |
| Processability |  | 4 | 4 | 2 |

N.D.: not determined

As shown in Table 1 above, it has been found that the polymers that satisfy the requirements of the present invention have excellent processability. On the other hand, the polymer of the Comparative Example, which has two peak tops and does not satisfy the requirements of the present invention, has poor processability.

The invention claimed is:

1. A conjugated diene polymer comprising a conjugated diene-based monomer unit and a group represented by Formula (I) below, wherein at least peaks H, M, and L below are present in a molecular weight distribution curve obtained by gel permeation chromatography measurement, and when the total area of the molecular weight distribution curve is 100%, the total peak area of peak H is 3% to 30%, the total peak area of peak M is 5% to 45%, and the total peak area of peak L is 40% to 80%

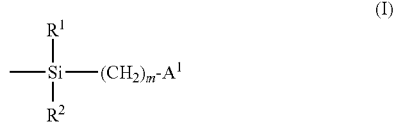

(in Formula (I), R$^1$ and R$^2$ independently denote a hydrocarbon group having 1 to 4 carbon atoms, a hydrocarbonoxy group having 1 to 4 carbon atoms, a hydroxy group, or a polymer chain comprising a conjugated diene-based monomer unit, m denotes an integer of 0 to 10, and A$^1$ denotes a polar functional group that does not have an active hydrogen)

Peak H: a peak for which the molecular weight at the peak top is higher than the molecular weight at the peak top of peak M Peak M: a peak for which, when the molecular weight at the peak top of peak H is MH, the molecular weight at the peak top is 0.6×MH to 0.8×MH Peak L: a peak for which, when the molecular weight at the peak top of peak H is MH, the molecular weight at the peak top is 0.2×MH to 0.4×MH.

2. The conjugated diene polymer according to claim 1, wherein A$^1$ in Formula (I) is a group represented by Formula (II) or (III) below

(in Formula (II), R$^3$ and R$^4$ independently denote a hydrocarbon group having 1 to 8 carbon atoms and optionally having a nitrogen atom, an oxygen atom, or a silicon atom, or R$^3$ and R$^4$ are bonded and represent a divalent hydrocarbon group having 2 to 20 carbon atoms and optionally having a nitrogen atom, an oxygen atom, or a silicon atom)

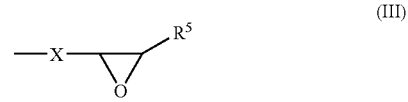

(in Formula (III), X denotes a divalent hydrocarbon group having 1 to 6 carbon atoms and optionally having an oxygen atom, and R$^5$ denotes hydrogen or a hydrocarbon group having 1 to 6 carbon atoms).

3. The conjugated diene polymer according to claim 1, wherein it further comprises an aromatic vinyl-based monomer unit.

4. The conjugated diene polymer according to claim 3, wherein, when the total amount of the conjugated diene-based monomer unit and the aromatic vinyl-based monomer unit is 100 wt %, the aromatic vinyl-based monomer unit is at least 10 wt % but no greater than 50 wt %.

5. The conjugated diene polymer according to claim 1, wherein, when the total area of the molecular weight distribution curve is 100%, the total peak area of the peak H is at least 5% but no greater than 25%, the total peak area of the peak M is at least 10% but no greater than 40%, and the total peak area of the peak L is at least 50% but no greater than 70%.

6. The conjugated diene polymer according to claim 1, wherein it has a Mooney viscosity measured at 100° C. in accordance with JIS K6300 of at least 10 but no greater than 200.

7. The conjugated diene polymer according to claim 1, wherein, when the content of the conjugated diene-based monomer unit is 100 mole %, the amount of vinyl bonds of the conjugated diene polymer is at least 10 mole % but no greater than 70 mole %.

8. The conjugated diene polymer according to claim 1, wherein the conjugated diene polymer is a modified conjugated diene polymer obtained by reacting, with a silicon compound represented by Formula (IV), a conjugated diene polymer obtained by polymerization in a hydrocarbon solvent using an alkali metal catalyst

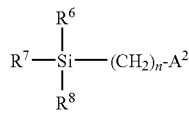

(IV)

(in Formula (IV), $R^6$, $R^7$, and $R^8$ independently denote a hydrocarbon group having 1 to 4 carbon atoms or a hydrocarbonoxy group having 1 to 4 carbon atoms, at least one of $R^6$, $R^7$, and $R^8$ is a hydrocarbonoxy group having 1 to 4 carbon atoms, n denotes an integer of 0 to 10, and $A^2$ denotes a polar functional group that does not have an active hydrogen).

9. A method for producing a conjugated diene polymer, comprising steps 1, 2, and 3 below:
   (step 1): a step of polymerizing a conjugated diene-containing monomer in a hydrocarbon solvent in the presence of an alkali metal catalyst, thus giving a conjugated diene polymer having a terminal catalyst-derived alkali metal;
   (step 2): a step of adding a silicon compound represented by Formula (IV) below in an amount of 0.05 to 0.35 moles per mole of alkali metal of the alkali metal catalyst used in step 1 to the hydrocarbon solution of the conjugated diene polymer of step 1 and mixing; and
   (step 3): a step of adding to the hydrocarbon solution of the conjugated diene polymer of step 2 the silicon compound represented by Formula (IV) below in an amount that together with the amount added in step 2 makes the total amount at least 0.5 moles per mole of alkali metal of the alkali metal catalyst used in step 1 and mixing

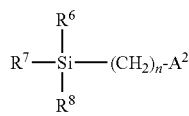

(IV)

(in Formula (IV), $R^6$, $R^7$, and $R^8$ independently denote a hydrocarbon group having 1 to 4 carbon atoms or a hydrocarbonoxy group having 1 to 4 carbon atoms, at least one of $R^6$, $R^7$, and $R^8$ is a hydrocarbonoxy group having 1 to 4 carbon atoms, n denotes an integer of 0 to 10, and $A^2$ denotes a polar functional group that does not have an active hydrogen).

10. The method for producing a conjugated diene polymer according to claim 9, wherein $A^2$ in Formula (IV) is a group represented by Formula (II) or (III) below

(II)

(in Formula (II), $R^3$ and $R^4$ independently denote a hydrocarbon group having 1 to 8 carbon atoms and optionally having a nitrogen atom, an oxygen atom, or a silicon atom, or $R^3$ and $R^4$ are bonded and represent a divalent hydrocarbon group having 2 to 20 carbon atoms and optionally having a nitrogen atom, an oxygen atom, or a silicon atom)

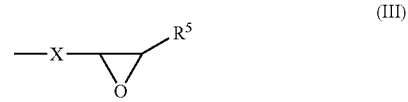

(III)

(in Formula (III), X denotes a divalent hydrocarbon group having 1 to 6 carbon atoms and optionally having an oxygen atom, and $R^5$ denotes hydrogen or a hydrocarbon group having 1 to 6 carbon atoms).

11. The method for producing a conjugated diene polymer according to claim 9, wherein all of $R^6$, $R^7$, and $R^8$ in Formula (IV) are hydrocarbonoxy groups having 1 to 4 carbon atoms.

12. The method for producing a conjugated diene polymer according to claim 9, wherein the alkali metal catalyst is an organolithium compound or organosodium compound having 2 to 20 carbon atoms.

13. The method for producing a conjugated diene polymer according to claim 9, wherein the amount of silicon compound represented by Formula (IV) added in step 2 is 0.1 to 0.3 moles per mole of alkali metal of the alkali metal catalyst, and the amount of silicon compound represented by Formula (IV) added in step 3 is, per mole of alkali metal of the alkali metal catalyst used in step 1, at least 1 mole but no greater than 5 moles as a total amount with the amount added in step 2.

14. The method for producing a conjugated diene polymer according to claim 9, wherein the polymerization temperature in step 1 is 0° to 100° C., and the polymerization time is 10 minutes to 5 hours.

15. A conjugated diene polymer composition comprising the conjugated diene polymer according to claim 1 combined with silica.

16. The polymer composition according to claim 15, wherein the amount of silica combined is 10 to 150 parts by weight relative to 100 parts by weight of rubber components including the conjugated diene polymer.

* * * * *